INVENTORS
HAROLD F. MAY
HAROLD L. SHOEMAKER
ATTORNEYS 2,942,355

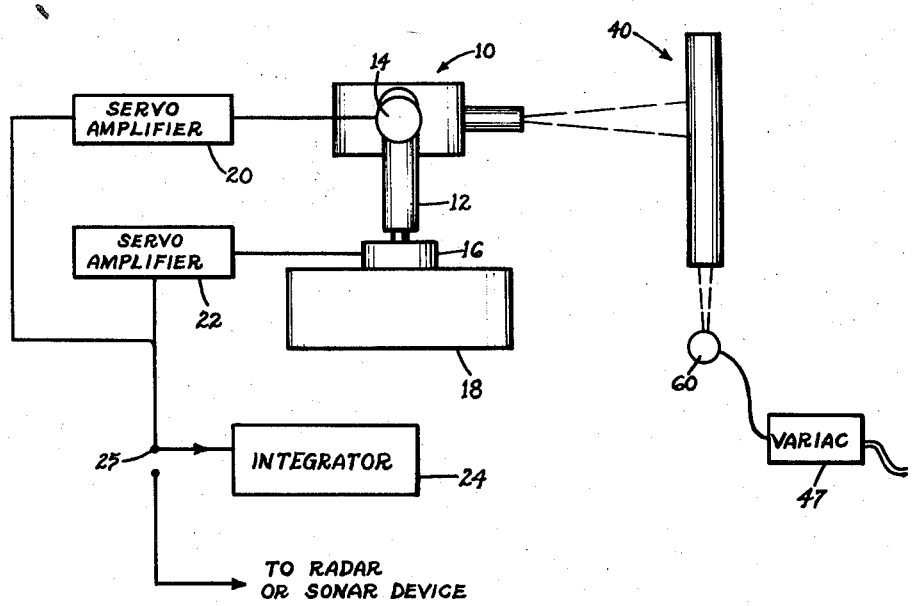
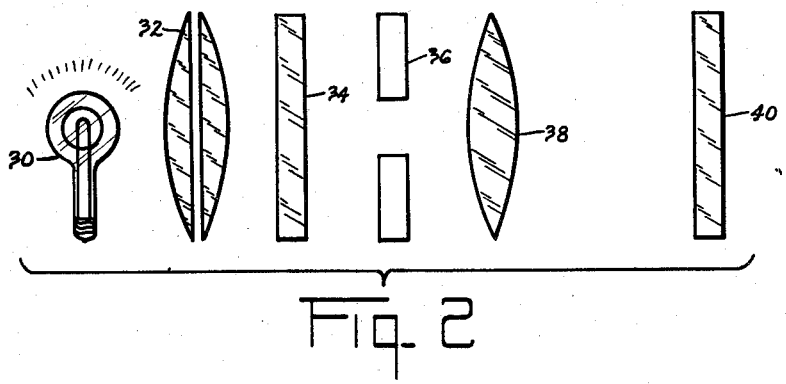

SERVO PROJECTION SYSTEM

Harold F. May, Basking Ridge, N.J., and Harold L. Shoemaker, Manhattan Beach, Calif., assignors, by mesne assignments, to the United States of America as represented by the Secretary of the Navy Filed Oct. 4, 1955, Ser. No. 538,544

5 Claims. (Cl. 35—10.2)

This invention relates to improvements in training apparatus, and more particularly pertains to apparatus for use in teaching ship maneuvering and battle tactics.

This invention provides a device that solves the long existing problem of displaying continuously the course of a moving vehicle derived from front-projected information displaying the instantaneous position of said vehicle. A servo-oriented projector displays the instantaneous position of a vehicle by projecting a discrete symbol upon a screen. Information generated by an integrator or a radar or sonar device determines the orientation of the projector, the integrator being used for simulation purposes and the radar or sonar devices being substituted during operations. A plotter, concealed from view behind the screen, traces the moving projected symbol with a grease pencil, so that an observer sees the traced course and the projected instantaneous position of the vehicle only.

The screen which is the subject of patent application Serial No. 538,543, now abandoned, consists of two edge-lighted plates, the front plate being glass and the rear plate being Plexiglas. The front plate contains a plurality of half-tone dots distributed uniformly to cover substantially sixty percent of the entire area. The half-tone dots reflect a major portion of the projected image back to the observer. The remaining light passes through the area between the dots for use by the plotters: the plotters trace the course of each vehicle with a grease pencil. The light-conducting properties of the Plexiglas plate causes the grease pencil tracings on the plate to appear luminescent. Thus, a continuous trace of a moving vehicle is made by plotters that are located behind the screen and are hidden from the observer's view.

A primary object of this invention is to provide a remotely controlled device that orients a distinctive projected light spot to simulate the course and speed of a vehicle.

Another object is to simulate simultaneously the programmed course and speed of a plurality of vehicles.

An additional object is to provide a device that displays remotely the course and speed of a vehicle being tracked by radar or sonar.

Other objects and many of the attendant advantages of this invention will be readily appreciated as the same becomes better understood by reference to the following detailed description when considered in connection with the accompanying drawings wherein:

Fig. 1 is a block diagram of the overall system;

Fig. 2 is an exploded schematic of the projector optical system;

Similar numerals refer to similar parts throughout the sereval views.

Figure 3:
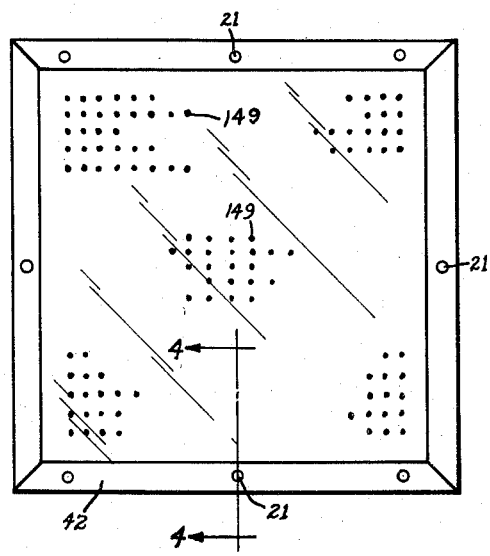
Fig. 3 is a front view of the projection screen.

A projector 10 mounted in a gimbal system 12 consists of north-south and east-west orientation rings driven by servo motors 14 and 16 respectively. Servo 14 is coupled to the east-west ring and servo 16 is coupled to the base 18. Servo 14 is fed by servo amplifier 20 and servo 16 is fed by its separate servo amplifiers 22.

The inputs to the servo amplifiers can, alternatively, stem from an integrator 24 or from tracking radar or sonar device by means of switch 25. The integrator can be of the standard ball and disk type and permit use of the device for training purposes, while the radar or sonar devices are utilized during training periods or in determining the actual course and speed of vehicles scanned. Thus, the projector is oriented, by displacement of the gimbal rings, from information generated by the integrator or by sonar or radar devices.

The optical system of the projector (Fig. 2) comprises a light source 30, a condenser lens system 32 including plano-convex lenses, a heat absorbing filter 34, a reticle 36 that forms a distinctive pattern of light, and an objective lens 38 adapted to focus the distinctive pattern of light on a screen 40. The heat absorbing filter 34 prevents overheating of the reticle 36 by the concentrated light beam.

Figure 4:
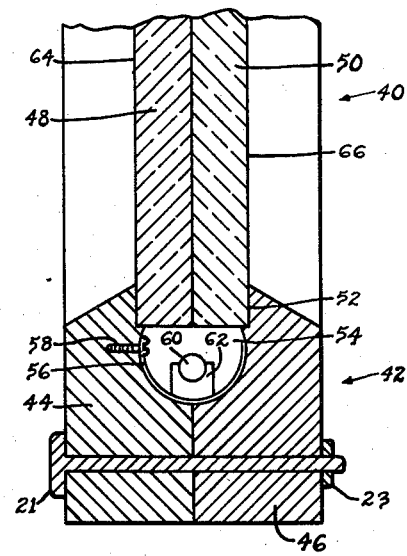
Fig. 4 is a section taken on the line 4—4 of Fig. 3.
Figure 5:
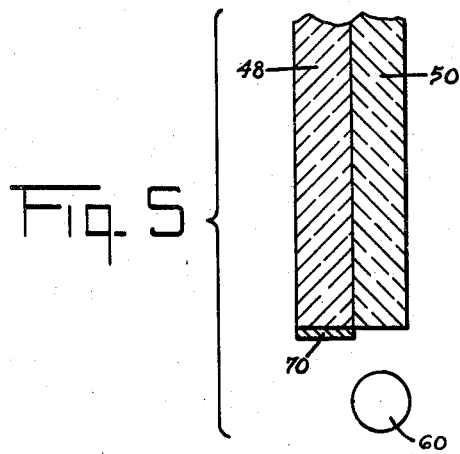
Fig. 5 is a fragmentary cross-sectional view of a modified screen and light source where one plate only is edge lighted.
Figure 6:
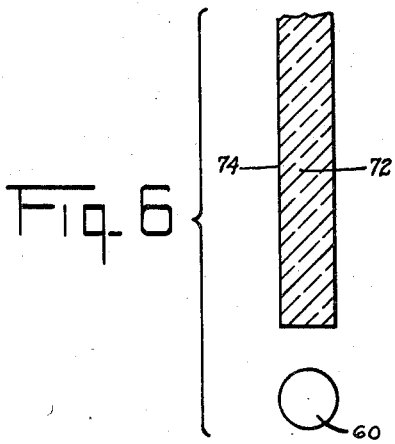
Fig. 6 is a fragmentary cross-sectional view of a modified screen and light source having a single plate of this invention.

Frame 42 of the edge-illuminated projection screen 40 comprises two sections 44 and 46 secured together by a plurality of nuts 23 and bolts 21 to encircle and support two adjacent parallel plates or panels 48 and 50. The frame sections 44 and 46 are cut out to form a channel 52 that receives and clamps the outer edges of the panels 48 and 50, which have light-transmitting properties as hereinafter described. The frame 42 is formed to provide a chamber 54 that extends around the plates, the edges of the plates being exposed within the chamber, as shown in Fig. 4. A reflector 56 having a white or polished surface is secured to one frame section 44 by means of nails or screws 58.

The chamber 54 contains a luminescent tube 60 that encircles the edges of the plates 44 and 50 and is held in position by the tube support 62, which is seated on the reflector 56. The electrodes of the tube are connected to a suitable power source through a variac 47, whereby the intensity of illumination of the edge lighting tube 60 can be varied.

The front plate 48 is viewed by the observer and reflects a substantial portion of a projected image. The back plate 50 is viewed by the plotter. The front plate 48 can be glass, and contains a multiplicity of reflecting half-tone dots 149 that are spaced uniformly over the surface 64, as by the silk screen process, to cover substantially sixty percent of the surface. The remainder, or approximately forty percent of the surface 64, is transparent. The rear plate 50 can be a clear light-transmitting material such as Plexiglas. Surface 66 of the plate 50 contains a series of vertical and horizontal grid lines.

The surface of the screen represents a specific operational area. The distinctive light spot projected on surface 64 of screen 40 reproduces the course of the tracked or simulated vehicle. The speed of travel of the light spot is proportional to the speed of the vehicle.

The opaque dots 149 on the surface 64 reflect a portion of the projected spot back to the observer. The transparent areas between the dots on the glass plate 48 allow the unreflected light to pass through the screen to be viewed by a plotter. The plotter follows the movement of the projected symbol with a grease pencil to indicate the course and present position of the tracked vehicle. Due to the ability of the Plexiglas sheet 50 to conduct light, the grease pencil trace luminesces.

In some instances it is desirable to limit the edge lighting of the glass plate 48. This is accomplished by covering the edges of the glass plate with an opaque light shield 70 such as an opaque paint or metal.

The plates 48 and 50 can be replaced with a single transparent light-conducting plate 72. The face 74 reflects a portion of the projected light, having a multiplicity of reflective opaque dots spaced uniformly to cover substantially sixty percent of the surface. The areas between the dots are transparent and allow the projected light to pass through the screen for utilization by a plotter.

In operation, a luminescent trace on the screen represents the course of the vehicle, and a projected light spot indicates the instant position of said vehicle. The speed of the vehicle is represented by the rate of advance of the light spot. Thus, a plurality of vehicles can be displayed by utilizing a number of projectors to project a number of distinctive spots on the screen. Each spot represents a different vehicle and different colored grease pencils can be used to distinguish the courses of each vehicle. At any instant, a permanent record of the course traversed by each vehicle can be made, as by photographing the completed tracings. At the conclusion of each exercise the grease pencil tracings can be erased to prepare the screen for re-use.

Obviously many modifications and variations of the present invention are possible in the light of the above teachings. It is therefore to be understood that within the scope of the appended claims the invention may be practised otherwise than as specifically described.

We claim:

1. A servo projection system comprising a projector containing a lamp, a condenser of two plano-convex lenses located in front of said lamp to concentrate the light from said lamp, a heat absorbing filter located in front of said condenser to absorb the heat from said light, a projected-image reflection screen, a reticule located in front of said filter to restrict a portion of the light to generate a desired image, and an objective lens to focus the generated image on said screen, a yoke pivotly connected to said projector, a first servo motor coupled to said yoke and said projector to orient said projector in the north-south direction, a second servo motor coupled to said yoke to orient said projector in the east-west direction, an integrator that controls the orientation of said projector, and a servo amplifier system coupled to receive a signal from said integrator and coupled to said first and second mentioned servo motors to position said servo motors, said projected image screen being useable with marking means composed of fluorescible material and comprising a first transparent plate having a multiplicity of spaced, light-reflecting areas covering a substantial portion of its front surface, said areas forming a reflection screen for light projected images, a second translucent, light-conducting plate, the front surface of which is in substantial abutment with the rear surface of said first plate, and fluorescence-producing light-emitting means situated near an edge of said second plate so that its light enters said second plate through said edge and is internally conducted through said second plate to strike the inner face of the rear surface thereof, thereby causing fluorescence of markings made upon the outer face of said rear surface with said marking means, which fluorescence makes said markings visible through the spacings between said light-reflecting areas on the front surface of said first plate at the same time that said front surface may be reflecting a projected image.

2. A projection system comprising a projector, a projected-image reflection screen in cooperation therewith, a gimbal ring system mounting said projector, first means to actuate a gimbal ring of said system and second means to actuate the other gimbal ring of said system to orient said projector, and an integrator coupled to feed actuating signals to said first and second means, said projected image screen being useable with marking means composed of fluorescible material and comprising a first transparent plate having a multiplicity of spaced, light-reflecting areas covering a substantial portion of its front surface, said areas forming a reflection screen for light projected images, a second translucent, light-conducting plate, the front surface of which is in substantial abutment with the rear surface of said first plate, and fluorescence-producing light-emitting means situated near an edge of said second plate so that its light enters said second plate through said edge and is internally conducted through said second plate to strike the inner face of the rear surface thereof, thereby causing fluorescence of markings made upon the outer face of said rear surface with said marking means, which fluorescence makes said markings visible through the spacings between said light-reflecting areas on the front surface of said first plate at the same time that said front surface may be reflecting a projected image.

3. A projection system comprising a projector, a projected-image reflection screen in cooperation therewith, a gimbal ring system mounting said projector, a first and second servo motor coupled respectively to the gimbal rings of said gimbal ring system to orient said projector in the vertical and horizontal planes respectively, servo amplifiers coupled to said servo motors, and an integrator coupled to feed actuating signals to said motors through said amplifiers to orient said projector, said projected image screen being useable with marking means composed of fluorescible material and comprising a first transparent plate having a multiplicity of spaced, light-reflecting areas covering a substantial portion of its front surface, said areas forming a reflection screen for light projected images, a second translucent, light-conducting plate, the front surface of which is in substantial abutment with the rear surface of said first plate, and fluorescence-producing light-emitting means situated near an edge of said second plate so that its light enters said second plate through said edge and is internally conducted through said second plate to strike the inner face of the rear surface thereof, thereby causing fluorescence of markings made upon the outer face of said rear surface with said marking means, which fluorescence makes said markings visible through the spacings between said light-reflecting areas on the front surface of said first plate at the same time that said front surface may be reflecting a projected image.

4. A projection system comprising a projected-image reflection screen in cooperation therewith, an integrator to generate a signal, a servo amplifier fed by said integrator, a servo motor coupled to said amplifier, and a projector positioned by said motor, said projected image screen being useable with marking means composed of fluorescible material and comprising a first transparent plate having a multiplicity of spaced, light-reflecting areas covering a substantial portion of its front surface, said areas forming a reflection screen for light projected images, a second translucent, light-conducting plate, the front surface of which is in substantial abutment with the rear surface of said first plate, and fluorescence-producing light-emitting means situated near an edge of said second plate so that its light enters said second plate through said edge and is internally conducted through said second plate to strike the inner face of the rear surface thereof, thereby causing fluorescence of markings made upon the outer face of said rear surface with said marking means, which fluorescence makes said markings visible through the spacings between said light-reflecting areas on the front surface of said first plate at the same time that said front surface may be reflecting a projected image.

5. A projection system comprising a projected-image reflection screen in cooperation therewith, means to generate a distinctive light spot, an integrator adapted to generate signals, and orientation means driving said projector, said orientation means being fed by said integrator, said projected image screen being useable with marking means composed of fluorescible material and comprising a first transparent plate having a multiplicity of spaced, light-reflecting areas covering a substantial portion of its front surface, said areas forming a reflection screen for light projected images, a second translucent, light-conducting plate, the front surface of which is in substantial abutment with the rear surface of said first plate, and fluorescence-producing light-emitting means situated near an edge of said second plate so that its light enters said second plate through said edge and is internally conducted through said second plate to strike the inner face of the rear surface thereof, thereby causing fluorescence of markings made upon the outer face of said rear surface with said marking means, which fluorescence makes said markings visible through the spacings between said light-reflecting areas on the front surface of said first plate at the same time that said front surface may be reflecting a projected image.

References Cited in the file of this patent

UNITED STATES PATENTS

| | | |
|---|---|---|
| 2,460,841 | Morey et al. | Feb. 8, 1949 |
| 2,495,296 | Springer | Jan. 24, 1950 |
| 2,584,267 | Hayek | Feb. 5, 1952 |
| 2,644,884 | Sullivan | July 7, 1953 |
| 2,692,377 | Brettell | Oct. 19, 1954 |
| 2,714,199 | Adams et al. | July 26, 1955 |
| 2,714,330 | Frederickson | Aug. 2, 1955 |